United States Patent [19]

Gunn et al.

[11] Patent Number: 5,553,886
[45] Date of Patent: Sep. 10, 1996

[54] FLANGELESS AIRBAG INFLATOR WITH MOUNTING ADAPTOR

[75] Inventors: Brian D. Gunn, Ogden; Aaron V. Cranney, Benson, both of Utah

[73] Assignee: Morton International, Inc., Chicago, Ill.

[21] Appl. No.: 518,029

[22] Filed: Aug. 22, 1995

[51] Int. Cl.$^6$ .................................................. B60R 21/16
[52] U.S. Cl. ........................................ 280/728.2; 280/741
[58] Field of Search ................................ 280/728.2, 732, 280/741

[56] References Cited

U.S. PATENT DOCUMENTS

| | | | |
|---|---|---|---|
| 4,153,273 | 8/1979 | Risko | 280/728.2 |
| 5,257,815 | 11/1993 | Bachelder et al. | 280/728.2 |
| 5,342,084 | 8/1994 | Rose et al. I | 280/728.2 |
| 5,356,175 | 10/1994 | Rose et al. II | 280/728.2 |
| 5,445,408 | 8/1995 | Mossi | 280/728.2 |
| 5,449,195 | 9/1995 | Garner | 280/728.2 |
| 5,458,362 | 10/1995 | Buchanan et al. | 280/728.2 |

*Primary Examiner*—Kenneth R. Rice
*Attorney, Agent, or Firm*—George W. Rauchfuss, Jr.; Gerald K. White

[57] ABSTRACT

An inflator for use in an airbag module assembly including a reaction canister having a stud-receiving opening in a front canister endplate and an inflator-receiving aperture in a rear canister endplate. The inflator includes an inflator housing and a mounting adaptor. The inflator housing has a generally cylindrical sidewall, a front housing end with a mounting stud extending therefrom, and a rear housing end. The mounting adaptor fits over the sidewall of the inflator housing adjacent the rear housing end and is secured to the housing by a snap engagement between a snap projection of one of the housing and the adaptor and a snap receptor of the other of the housing and the adaptor. The mounting adaptor is sized and adapted to extend through the inflator-receiving aperture of the rear canister endplate and has a radially extending flange sized and adapted to engage the rear canister endplate surrounding the inflator-receiving aperture. The mounting stud is sized and adapted to fit within the stud-receiving opening of the front canister endplate to be secured thereto so that the mounting stud and the adaptor, in combination, secure the inflator within the reaction canister and allow the inflator to withstand tensional loading between the canister endplates.

18 Claims, 4 Drawing Sheets

5,553,886

FLANGELESS AIRBAG INFLATOR WITH MOUNTING ADAPTOR

FIELD OF THE INVENTION

The present invention relates to an inflator for an airbag module assembly. More particularly, the present invention relates to a flangeless inflator having a mounting adaptor.

BACKGROUND OF THE INVENTION

Providing a mounting adaptor for securely mounting flangeless inflators within existing reaction canisters of airbag module assemblies so that the inflator can withstand a substantial tensional load would be useful. Also, adapting different sizes of flangeless inflators for mounting in existing reaction canisters would be helpful.

Airbag module assemblies are part of inflatable restraint systems that are employed in automobiles for protecting an occupant against injury by physically restraining the occupant's body when the automobile encounters a collision. The passenger side airbag module assembly normally includes a reaction canister housing an airbag cushion and an inflator which is mounted between two canister endplates of the canister. The airbag cushion has an open mouth positioned over the inflator that, once triggered by a remote collision sensor, provides the inflation gas for inflating the airbag cushion.

The inflator should be mounted so that it can withstand a tensional load to assist in holding the canister endplates attached to the reaction canister during inflation of the airbag cushion. It has been determined that to protect an occupant during a collision, the airbag cushion should inflate within 20 to 40 milliseconds after the initial impact. The inflation gas supplied to the airbag cushion, necessarily under high pressure to inflate the airbag within that short time, produces forces which tend to push the canister endplates of the reaction canister outward. Because of these excessive forces, an inflator should be mounted so that the inflator will be able to withstand a tensional load to assist in keeping the canister endplates attached to the reaction canister during inflation of the airbag cushion. As with all components used in automobiles, the inflator should also be mounted in a squeak and rattle-free manner.

Many prior art inflators have a mounting flange welded to or integral with one end thereof and a stud extending from the other end. The flange engages one canister endplate of the reaction canister while the stud extends through the other canister endplate and is secured thereto. Although this type of inflator provides squeak and rattle-free mounting that can handle large tensional loads, these inflators are sometimes difficult and costly to fabricate and are not easily adapted to different sizes of canisters.

One prior art mounting adaptor, shown and described in U.S. Pat. No. 5,342,084, mounts and adapts an inflator having a flange for use in a reaction canister that is longer than the inflator. Although this adaptor performs well and provides excellent strength, the adaptor partly relies upon a frictional engagement with the inflator and therefore may become unattached during shipping and handling prior to installation. In addition, this adaptor is designed for use with an inflator having a flanged end, when it would be useful to provide an adaptor that would accommodate an inflator with a flangeless end.

Another prior art mounting adaptor, shown and described in U.S. Pat. No. 5,356,175, is designed for use with a flangeless inflator that is shorter than the canister in which it is mounted. Although this adaptor also performs well and provides excellent strength, it relies upon a friction engagement to secure the inflator within the adaptor. This adaptor therefore does not allow the inflator to withstand a large tensional load, and also may become unattached during shipping and handling prior to installation.

Accordingly, providing a mounting adaptor for securely mounting different sizes of flangeless inflators within existing reaction canisters of airbag module assemblies so that a tensional load may be applied to the inflator would be useful. It would also be useful if the mounting adaptor provides squeak and rattle-free mounting and remains attached to the inflator during shipping and handling of the inflator prior to installation in a reaction canister of an airbag module assembly.

SUMMARY OF THE INVENTION

An object, therefore, of the present invention is to provide a mounting adaptor for securely mounting a flangeless inflator within a reaction canister of an airbag module assembly.

Another object of the present invention is to provide a mounting adaptor for a flangeless inflator that allows the inflator to withstand a tensional load between the canister endplates of a reaction canister.

An additional object of the present invention is to provide a mounting adaptor for a flangeless inflator that allows the use of different sizes of inflators with existing reaction canisters.

A further object of the present invention is to provide a mounting adaptor for a flangeless inflator that will stay attached to the inflator during shipping and handling of the inflator prior to installation in a reaction canister of an airbag module assembly.

Yet another object of the present invention is to provide a mounting adaptor for a flangeless inflator that will provide squeak and rattle-free mounting of the inflator within a reaction canister of an airbag module assembly.

In carrying out this invention, there is provided an inflator for use in an airbag module assembly including a reaction canister having a front canister endplate and an inflator-receiving aperture in a rear canister endplate. The inflator includes an inflator housing and a mounting adaptor. The inflator housing has a generally cylindrical sidewall, a front housing end with means for mounting the front housing end to the front canister endplate, and a rear housing end.

The mounting adaptor fits over the sidewall of the inflator housing adjacent the rear housing end and is secured to the housing by a snap engagement between a snap projection of one of the inflator housing and the adaptor and a snap receptor of the other of the housing and the adaptor.

The mounting adaptor is sized and adapted to extend through the inflator-receiving aperture of the rear canister endplate and has a radially extending flange sized and adapted to engage the rear canister endplate surrounding the inflator-receiving aperture. The adaptor and means for mounting the front housing end to the front canister endplate, in combination, secure the inflator within the reaction canister and allow the inflator to withstand tensional loading between the canister endplates.

According to one aspect of the present invention, the snap projection is located on the sidewall of the inflator housing and the snap receptor is located on the mounting adaptor. The mounting adaptor includes a cylindrical collar having the flange extending from one end thereof. The collar is sized and adapted to fit within the inflator-receiving aperture of the rear canister endplate and has a ramp extending from the other end thereof towards the sidewall of the inflator housing. The snap receptor is located on the collar adjacent the ramp and defines a plurality of circumferentially spaced-apart, inwardly extending, dimples. A generally cylindrical sleeve extends from the ramp and closely engages the sidewall of the adaptor housing.

The snap projection consists of a continuous bump extending radially outwardly from the sidewall of the inflator housing adjacent the rear housing end. The bump is engaged between the ramp and the dimples of the snap receptor to prevent the adaptor from moving forward or rearward with respect to the inflator housing. In addition, the cylindrical sleeve of the adaptor cannot expand over the snap projection, whereby the mounting adaptor cannot move rearwardly with respect to the inflator housing, even under tensional loading.

According to another aspect of the present invention, the snap receptor is located on the sidewall of the inflator housing and the snap projection is located on the mounting adaptor. The snap receptor comprises a circumferential groove formed in the sidewall of the inflator housing. The mounting adaptor includes a cylindrical sleeve having the flange extending therefrom. The sleeve fits around the cylindrical sidewall of the inflator housing and is sized and adapted to fit within the inflator-receiving aperture of the rear canister endplate. The snap projection consists of a lip extending inwardly from the sleeve of the mounting adaptor and engaging the circumferential groove to prevent the adaptor from moving forward or rearward with respect to the inflator housing. The sleeve includes one or more expansion slots, and alternatively the lip is provided in a plurality of discontinuous segments.

In summary, the present invention provides a flangeless inflator having a mounting adaptor that securely mounts the inflator within a reaction canister of an airbag module assembly. The mounting adaptor also allows the inflator to withstand a tensional load between the canister endplates of a reaction canister, and provides squeak and rattle-free mounting of the inflator. In addition, the mounting adaptor remains attached to the inflator during shipping and handling of the inflator prior to installation in a reaction canister, and allows different sizes of inflators to be mounted in existing reaction canisters.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
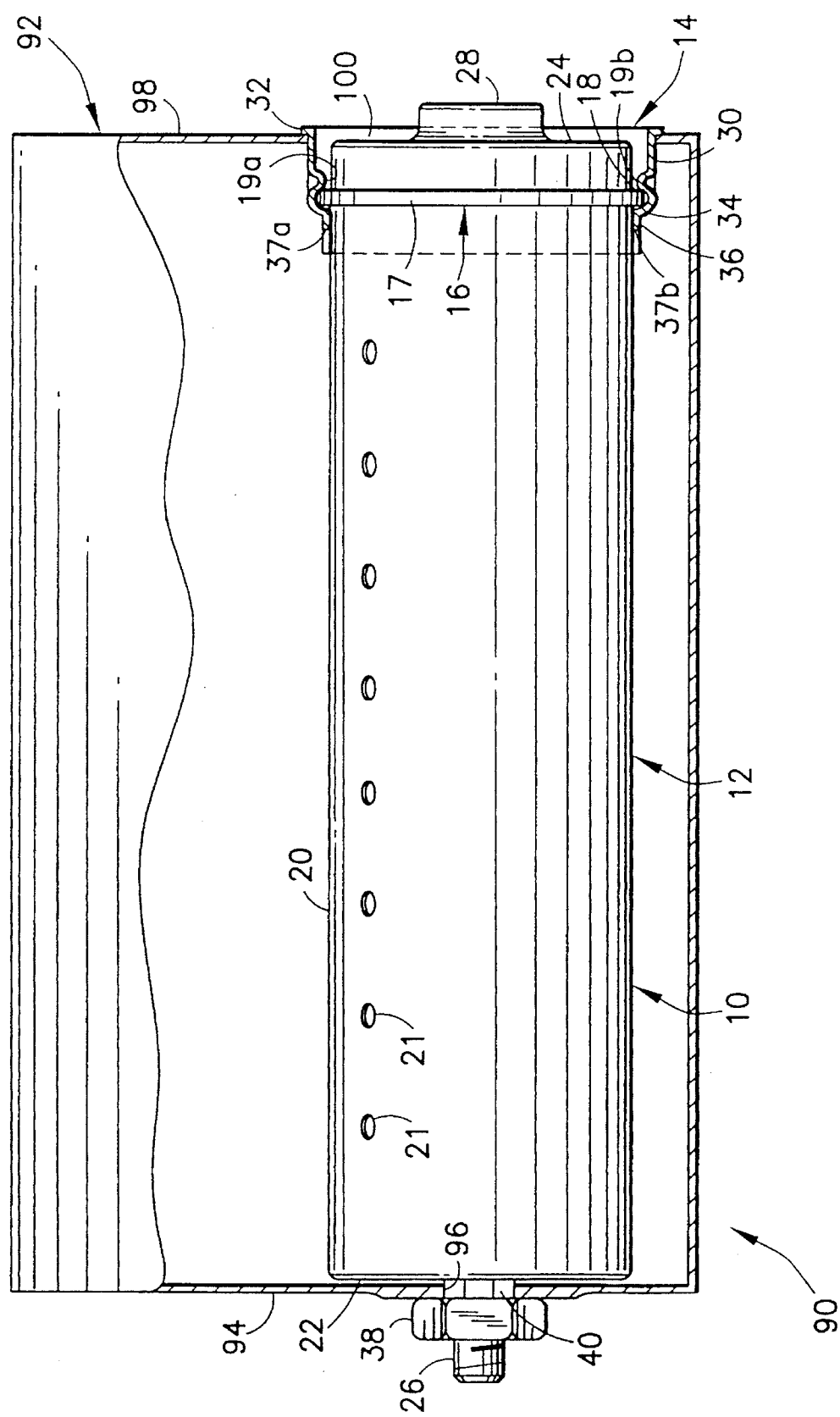
FIG. 1 is a side elevation view, partially cut away, of an airbag module assembly containing an inflator according to the present invention.
Figure 2:
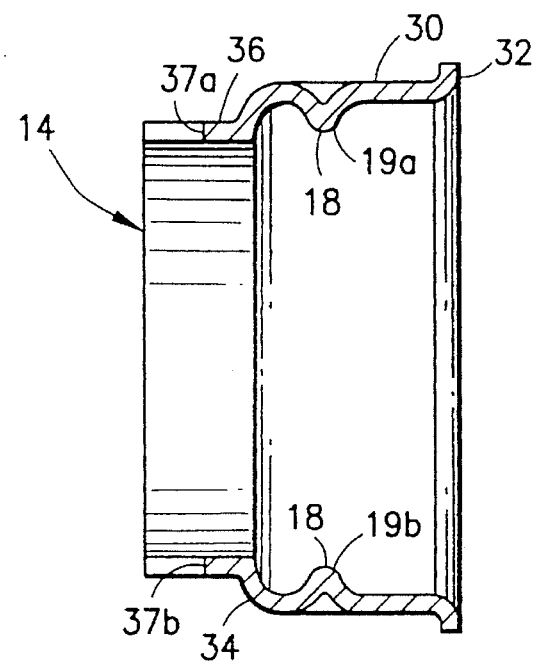
FIG. 2 is a cross-sectional side view of a mounting adaptor of the inflator of FIG. 1.
Figure 3:
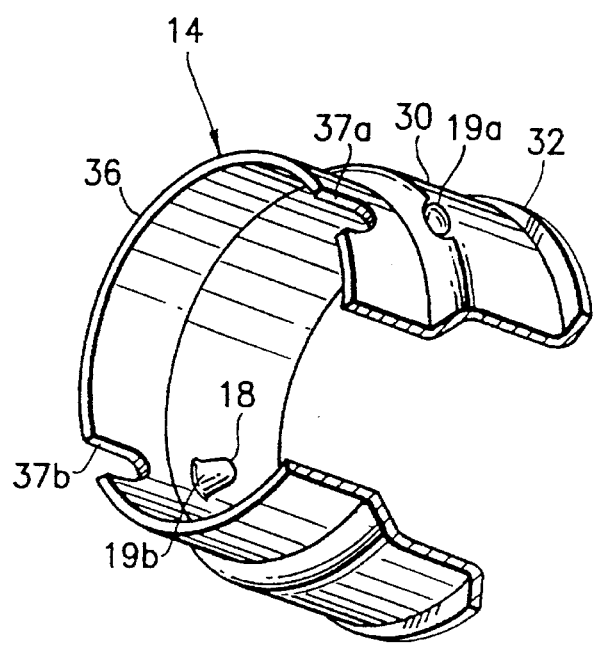
FIG. 3 is a perspective view, partially cut away, of the mounting adaptor of FIG. 2.

Referring first to FIGS. 1–3, the present invention is directed to an inflator, generally represented by the reference numeral 10. The inflator 10 includes an inflator housing 12 and a mounting adaptor 14 secured together by a snap engagement between a snap projection 16 of the housing 12 and a snap receptor 18 of the adaptor 14. The inflator 10 is for use in an airbag module assembly, generally represented by the reference numeral 90, also including a reaction canister 92 having a stud-receiving opening 96 in a front canister endplate 94 and an inflator-receiving aperture 100 in a rear canister endplate 98.

The airbag module assembly 90 includes other components; however, how an airbag module is mounted within an automobile and how the different components of an airbag module work are known in the art and, accordingly, are not described in detail as they do not in themselves constitute features of the present system. Only the parts of a reaction canister 92 relating to the inflator according to the present invention will be described in detail.

The inflator housing 12 has a generally cylindrical sidewall 20 forming a plurality of gas exhaust ports 12, a front housing end 22 with a mounting stud 126 extending therefrom, and a rear housing end 24 with a boss 28 extending therefrom. The boss 28 normally has a receptacle for receiving a connector from a remote collision sensor. The snap projection 16 comprises a continuous bump 17 extending radially outwardly from the sidewall 20 of the inflator housing 12 adjacent the rear housing end 24. It should be noted that the bump 17 is integral with the sidewall 20 and the sidewall is made thicker than normal so that the continuous bump 17 can be formed by machining down the sidewall 20 around the bump 17.

The mounting adaptor 14 fits over the sidewall 20 of the inflator housing 12 adjacent the rear housing end 24 and has a cylindrical collar 30 sized and adapted to extend through and engage the inflator-receiving aperture 100 of the rear canister endplate 98. The collar 30 has a radially extending flange 32 sized and adapted to engage the rear canister endplate 98 surrounding the inflator-receiving aperture 100. A ramp 34 extends from the collar 30 towards the sidewall 20 of the inflator housing 12. The snap receptor 18 is located on the collar 30 adjacent the ramp 34 and defines a pair of opposed, inwardly extending dimples 19a,19b. The continuous bump 17 comprising the snap projection 16 is engaged between the ramp 34 and the dimples 19a,19b comprising the snap receptor 18 to secure the mounting adaptor 14 to the inflator housing 12. A generally cylindrical sleeve 36 extends from the ramp 34 and closely engages the sidewall 20.

The mounting stud 26 is sized and adapted to fit within the stud-receiving opening 96 of the front canister endplate 94 and is secured by a nut 38 or the like. The mounting stud 28 includes a keyed base 40 and the stud-receiving opening 96 is also keyed to correctly orient the inflator 10 within the canister 92. The mounting stud 26 and the adaptor 14, in combination, secure the inflator 10 within the reaction canister 92 and allow the inflator 10 to withstand substantial tensional loading between the canister endplates.

During assembly, the mounting adaptor 14 is slid onto the inflator housing 12 prior to installation of the inflator 10 in the reaction canister 92. The adaptor 14 is slid over the sidewall of the inflator housing 12 from the front housing end 22 until the dimples 19a,19b are slid over the continuous bump 17 so that the bump 17 snaps between the ramp 34 and the dimples 19a,19b. Pushing the dimples 19a,19b over the snap projection 16 of the inflator housing 12 requires a substantial amount of force, however, pulling the snap projection 16 out from between the ramp 34 and the dimples 19a,19b also requires a substantial amount of force. This ensures that the adaptor 14 will stay attached to the inflator housing The sleeve 36 includes two notches 37a,37b that allow the sleeve 36 to expand slightly so that the dimples 19a,19b slide over the bump 17 with less resistance for easier assembly.

The bump 17 seated between the ramp 34 and the dimples 19a, 19b provides a snap or interference engagement between the mounting adaptor 14 and the inflator housing 12. This snap engagement prevents forward or rearward movement of the adaptor 14 with respect to the inflator housing 12. In addition, the sleeve 36 is of smaller diameter than the snap projection 16 and closely embraces the cylindrical sidewall 20 of the inflator housing 12. Thus the sleeve 36 cannot be pulled over the snap projection 16 without substantial deformation of the sleeve 36. This allows the inflator 10 to withstand a tensional load between the canister endplates 94,98. Additionally, the close fit between the bump 17, the ramp 34 and the dimples 19a, 19b provides squeak and rattle-free mounting.

The inflator 10 may be used with a reaction canister 92 that is longer than the inflator housing 12 by providing the adaptor 14 with a collar 30 sized and adapted to extend between the inflator housing 12 and the rear canister endplate 98 of the longer reaction canister 92. In this way, the adaptor 14 allows shorter inflators to be used with an existing reaction canister.

Referring now to FIGS. 14 through 16, another inflator 50 according to the present invention is shown. The inflator 50 includes an inflator housing 52 having a snap receptor 54 and a mounting adaptor 56 having a snap projection 58.

The inflator housing 52 has a generally cylindrical sidewall 60 forming a plurality of gas exhaust ports 161, a front housing end 162 with a mounting stud 166 extending therefrom, and a rear housing end 64 with a boss 68 extending therefrom. The boss 68 normally has a receptacle for receiving a connector from a remote collision sensor. The snap receptor 54 consists of a circumferential groove 55 located on the sidewall 60 of the inflator housing 52 adjacent the rear housing end 64.

The mounting adaptor 56 includes a cylindrical sleeve 70 fitting around the cylindrical sidewall 60 of the inflator housing 52 adjacent the rear housing end 64, and sized and adapted to fit within the inflator-receiving aperture 100 of the rear canister endplate 98 of the reaction canister 92. A flange 72 extends radially from the sleeve 70 and is sized and adapted to engage the rear canister endplate 98 surrounding the inflator-receiving aperture 100. An adaptor end cap 74 extends inwardly from the cylindrical sleeve 70 to cover the rear housing end 64 and has an access aperture 76 through which the boss 68 extends. The snap projection 58 consists of a lip 59 extending inwardly from the sleeve 70 of the mounting adaptor 56 and seated within the circumferential groove 54 of the inflator housing 52 to secure the adaptor 56 to the housing 52.

The mounting stud 166 is sized and adapted to fit within the stud-receiving opening 96 of the front canister endplate 94 and be secured thereto by a nut 178 or the like. The stud 166 includes a keyed base 80 and the stud-receiving opening 96 is also keyed to correctly orient the inflator 50 within the canister 92. The mounting stud 66 and the adaptor 56, in combination, secure the inflator 50 within the reaction canister 92 and allow the inflator 50 to withstand substantial tensional loading between the canister endplates of the reaction canister 92.

During assembly, the mounting adaptor 56 is slid over the sidewall 60 of the inflator housing 52 from the rear housing end 64. The lip 59 slides over the sidewall 60 until it snaps into the circumferential groove 55 on the sidewall 60 of the inflator housing 52. The sleeve 70 includes at least one notch 82 so that the sleeve 70 may expand slightly to allow the lip 59 of the adaptor 56 to expand and therefore more easily slide over the sidewall 60 of the inflator housing 52 to be seated in the groove 55. The notch 82 ensures that assembling the adaptor 56 onto the inflator housing 52 can be accomplished easily. However once assembled, pulling the lip 59 out from within the groove 55 is difficult. Alternatively, the lip 58 may be provided in discontinuous segments, eliminating or reducing the need for the expansion notch 82.

The lip 59 engaged within the groove 55 provides a snap or interference engagement that prevents forward or rearward movement of the adaptor 56 with respect to the inflator housing 52 and allows the inflator 50 to withstand tensional loading between the canister endplates 94,98. Additionally, the close fit between the lip 59 and the circumferential groove 55 provides squeak and rattle-free mounting.

The inflator 50 may be used with a reaction canister 92 that is longer than the inflator housing 52 by providing the adaptor 56 with a sleeve 70 sized and adapted to extend between the inflator housing 52 and the rear canister endplate 98 of the reaction canister 92. In this way, the adaptor allows shorter inflators to be used with an existing reaction canister.

In summary, the present invention provides flangeless inflators 10,50 having mounting adaptors 14,56 that securely mount the inflators within the reaction canister 92 of an airbag module assembly 90. The mounting adaptors 14,56 allow the inflators 10,50 to withstand a tensional load between the canister endplates 94,98 and provide squeak and rattle-free mounting of the inflators 10,50. In addition, the mounting adaptors 14,56 stay attached to their respective inflators 10,50 during shipping and handling of the inflators 10,50 prior to installation in a reaction canister, and allow shorter inflators to be mounted in existing reaction canisters.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator for use in an airbag module assembly including a reaction canister having a front canister endplate and an inflator-receiving aperture in a rear canister endplate, the inflator comprising:

an inflator housing having a generally cylindrical sidewall, a front housing end with means for mounting the front housing end to the front canister endplate, and a rear housing end; and a mounting adaptor fitting over the sidewall of the inflator housing adjacent the rear housing end and secured to the housing by a snap engagement between a snap projection of one of the housing and the adaptor and a snap receptor of the other of the housing and the adaptor, the mounting adaptor sized and adapted to extend through the inflator-receiving aperture of the rear canister endplate and having a radially extending, annular flange sized and adapted to engage the rear canister endplate surrounding the inflator-receiving aperture;

whereby the front housing end mounting means and the adaptor, in combination, secure the inflator within the reaction canister and allow the inflator to withstand tensional loading between the canister endplates of the reaction canister.

2. The inflator of claim 1 wherein the snap projection is located on the sidewall of the inflator housing and the snap receptor is located on the mounting adaptor.

3. The inflator of claim 2 wherein the mounting adaptor comprises a cylindrical collar having the flange extending from one end thereof, the collar sized and adapted to extend through the inflator-receiving aperture of the rear canister endplate, the collar including a ramp extending from the other end thereof towards the sidewall of the inflator housing, the snap receptor located on the collar adjacent the ramp and defining a plurality of circumferentially spaced-apart, inwardly extending, dimples, and a generally cylindrical sleeve extending from the ramp and closely engaging the sidewall of the adaptor housing, the snap projection comprises a continuous bump extending radially outwardly from the sidewall of the inflator housing adjacent the rear housing end and engaged between the ramp and the dimples of the mounting adaptor.

4. The inflator of claim 3 wherein the sleeve includes at least one notch to allow the adaptor to be more easily attached to the inflator housing.

5. The inflator of claim 4 for use with a reaction canister that is longer than the inflator housing wherein the sleeve of the adaptor is sized and adapted to extend between the inflator housing and the rear canister endplate, whereby the adaptor allows the inflator to be used with the longer reaction canister.

6. The inflator of claim 1 wherein the snap receptor is located on the sidewall of the inflator housing and the snap projection is located on the mounting adaptor.

7. The inflator of claim 6 wherein the snap receptor comprises a circumferential groove located on the sidewall of the inflator housing adjacent the rear inflator end, the mounting adaptor comprises a cylindrical sleeve having the flange extending therefrom, the sleeve fitting around the cylindrical sidewall of the inflator housing and sized and adapted to extend through the inflator-receiving aperture of the rear canister endplate, the snap projection comprising a lip extending inwardly from the sleeve of the mounting adaptor and engaging the circumferential groove.

8. The inflator of claim 7 wherein the lip is in segments.

9. The inflator of claim 7 wherein the sleeve includes at least one notch to allow the adaptor to be more easily attached to the inflator housing.

10. The inflator of claim 7 wherein the adaptor further includes an adaptor end cap extending inwardly from the cylindrical sleeve to cover the rear housing end.

11. The inflator of claim 10 wherein the lip is in segments.

12. The inflator of claim 10 wherein the sleeve includes at least one notch to allow the adaptor to be more easily attached to the inflator housing.

13. The inflator of claim 10 wherein the adaptor end cap has a central access aperture, the inflator housing further including a boss rearwardly extending from the rear housing end through the access aperture.

14. The inflator of claim 7 for use with a reaction canister that is longer than the inflator housing wherein the sleeve of the adaptor is sized and adapted to extend between the inflator housing and the rear canister endplate, whereby the adaptor allows the inflator to be used with the longer reaction canister.

15. An inflator for use in an airbag module assembly including a reaction canister having a stud-receiving opening in a front canister endplate and an inflator-receiving aperture in a rear canister endplate, the inflator comprising:

an inflator housing having a generally cylindrical sidewall forming a plurality of gas exhaust ports, a front housing end with a mounting stud extending therefrom and sized and adapted to fit within the stud-receiving opening of the front canister endplate to be secured thereto, a rear housing end with a boss extending therefrom, and a snap projection defining an annular continuous bump extending radially outwardly from the sidewall of the inflator housing adjacent the rear housing end; and a mounting adaptor fitting over the sidewall of the inflator housing adjacent the rear housing end and having a cylindrical collar with a flange radially extending from one end thereof, the collar sized and adapted to extend through the inflator-receiving aperture of the rear canister endplate with the flange sized and adapted to engage the rear canister endplate surrounding the inflator-receiving aperture, the collar including a ramp extending from the other end thereof towards the sidewall of the inflator housing, a snap receptor located on the collar adjacent the ramp and defining a pair of opposed, inwardly extending, dimples, the continuous bump of the snap projection engaged between the ramp and the dimples of the snap receptor to secure the mounting adaptor to the inflator housing, and a generally cylindrical sleeve extending from the ramp and closely engaging the sidewall of the adaptor housing, the sleeve including at least one notch to allow the dimples to be more easily slide over the continuous bump to attach the mounting adaptor to the inflator housing;

whereby the mounting stud and the adaptor, in combination, secure the inflator within the reaction canister and allow the inflator to withstand tensional loading between the canister endplates.

16. The inflator of claim 15 for use with a reaction canister that is longer than the inflator housing wherein the collar of the adaptor is sized and adapted to extend between the inflator housing and the rear canister endplate, whereby the adaptor allows the inflator to be used with the longer reaction canister.

17. An inflator for use in an airbag module assembly including a reaction canister having a stud-receiving opening in a front canister endplate and an inflator-receiving aperture in a rear canister endplate, the inflator comprising:

an inflator housing having a generally cylindrical sidewall forming a plurality of gas exhaust ports, a front housing end with a mounting stud extending therefrom and sized and adapted to fit within the stud-receiving opening of the front canister endplate to be secured thereto, a rear housing end with a boss extending therefrom, and a snap receptor defining a circumferential groove formed about the sidewall of the inflator housing adjacent the rear housing end; and a mounting adaptor having a cylindrical sleeve fitting over the sidewall of the inflator housing adjacent the rear housing end, the cylindrical sleeve fitting around the cylindrical sidewall of the inflator housing and sized and adapted to extend through the inflator-receiving aperture of the rear canister endplate, a flange extending radially from the sleeve and sized and adapted to engage the rear canister endplate surrounding the inflator-receiving aperture, and an adaptor end cap extending inwardly from the cylindrical sleeve to cover the rear housing end, the adaptor end cap having a central access aperture through which the boss extends, the adaptor also having a snap projection comprising a lip extending inwardly from the sleeve of the mounting adaptor and engaging the circumferential groove of the snap receptor of the inflator housing to secure the adaptor to the inflator housing, the sleeve including at least one notch to allow the lip of the adaptor to be more easily slide over the inflator housing to engage the groove;

whereby the mounting stud and the adaptor, in combination, secure the inflator within the reaction canister and allow the inflator to withstand tensional loading between the canister endplates.

18. The inflator of claim 17 for use with a reaction canister that is longer than the inflator housing wherein the sleeve of the adaptor is sized and adapted to extend between the inflator housing and the rear canister endplate, whereby the adaptor allows the inflator to be used with the longer reaction canister.

* * * * *

UNITED STATES PATENT AND TRADEMARK OFFICE
CERTIFICATE OF CORRECTION

PATENT NO. : 5,553,886

DATED : September 10, 1996

INVENTOR(S) : Brian D. Gunn and Aaron V. Cranney

It is certified that error appears in the above-indentified patent and that said Letters Patent is hereby corrected as shown below:

At column 4, line 26, "inflator according" should be --inflator 10 according--.

At column 4, line 29, "exhaust ports 12," should be --exhaust ports 21,--.

At column 4, line 30, "mounting stud 126" should be --mounting stud 26--.

At column 5, line 4, "sidewall of the inflator" should be --sidewall 20 of the inflator--.

At column 5, line 13, "housing The" should be --housing 12. The--.

Figure 4:
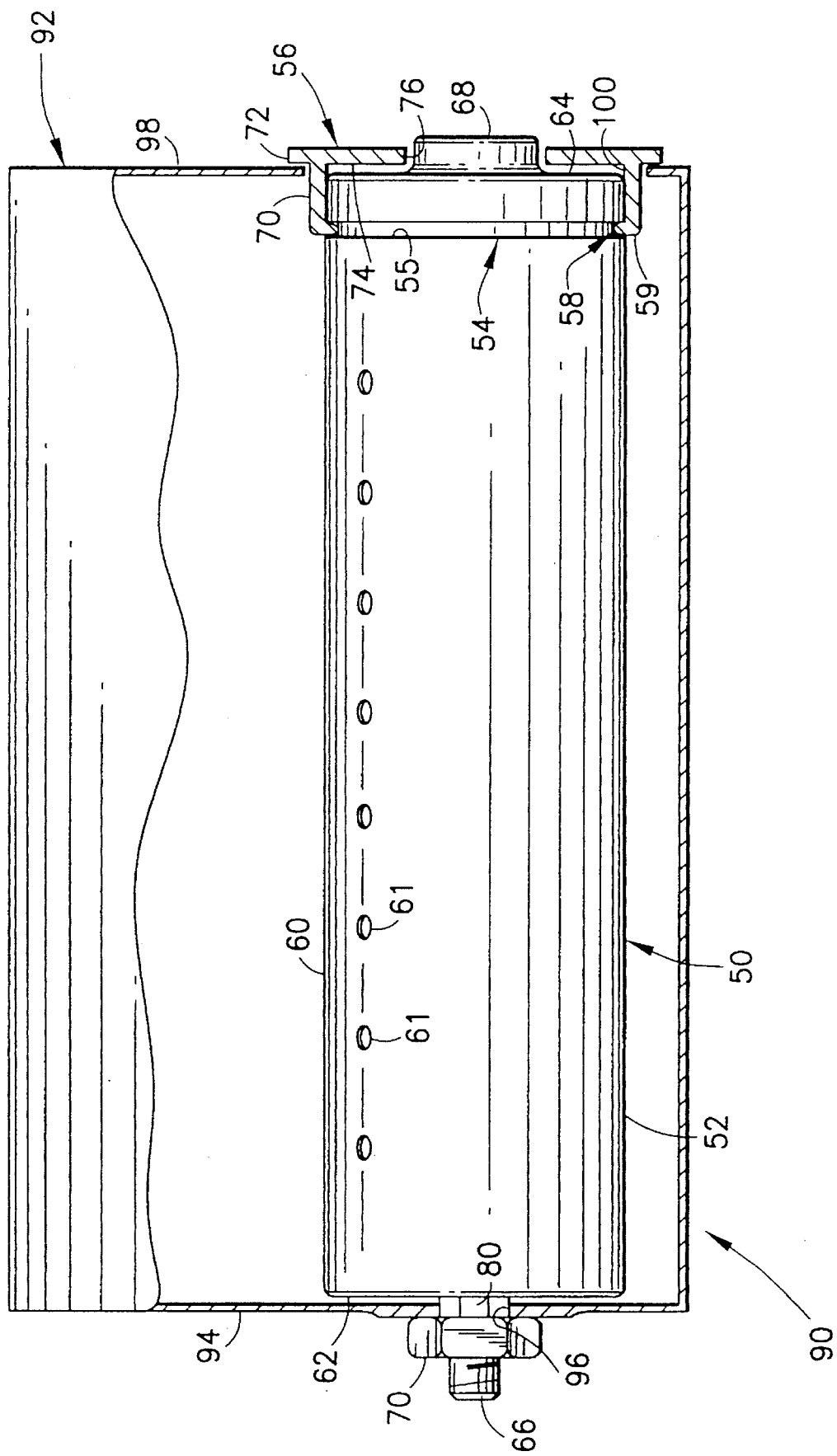
FIG. 4 is a side elevation view, partially cut away, of an airbag module assembly containing another inflator according to the present invention.
Figure 5:
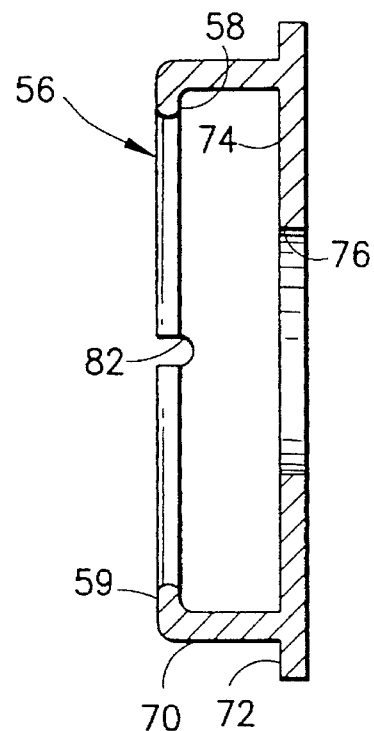
FIG. 5 is a cross-sectional side view of a mounting adaptor of the inflator of FIG. 4.
Figure 6:
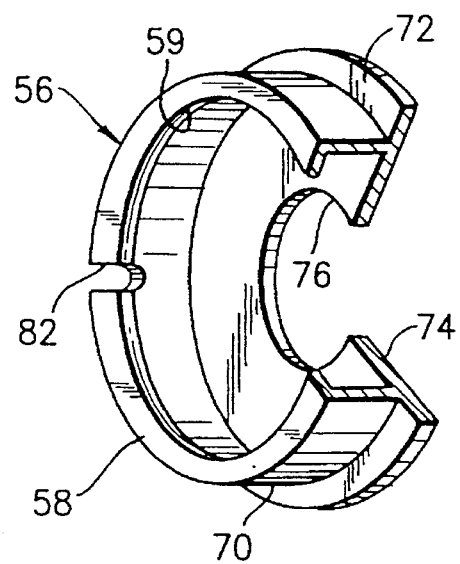
FIG. 6 is a perspective view, partially cut away, of the mounting adaptor of FIG. 5.

At column 5, line 38, "FIGS. 14 through 16," should be --FIGS. 4 through 6,--.

At column 5, line 43, "exhaust ports 161," should be --exhaust ports 61,--.

At column 5, line 44, "housing end 162 with a mounting stud 166" should be --housing end 62 with a mounting stud 66--.

At column 5, line 66, "mounting stud 166" should be --mounting stud 66--.

At column 6, line 1, "nut 178" should be --nut 78--.

At column 6, lines 1 and 2, "The stud 166" should be --The stud 66--.

UNITED STATES PATENT AND TRADEMARK OFFICE
CERTIFICATE OF CORRECTION

PATENT NO. : 5,553,886
DATED : September 10, 1996
INVENTOR(S) : Brian D. Gunn and Aaron V. Cranney It is certified that error appears in the above-indentified patent and that said Letters Patent is hereby corrected as shown below:

At column 7, line 1, "between-a" should be --between a--.

At column 7, line 6, "radially extending," should be --radially extending--.

At column 8, line 19, "defining an annular continuous" should be --defining a continuous--.

At column 8, line 24, "with a flange" should be --with an annular flange--.

Signed and Sealed this

Eighteenth Day of February, 1997

Attest:

BRUCE LEHMAN

*Attesting Officer*  Commissioner of Patents and Trademarks